INVENTOR
JOHANNES A. HARINGX
EVERHARDUS A. MUIJDERMAN
BY HERRE RINIA

United States Patent Office 3,154,353
Patented Oct. 27, 1964

3,154,353
AXIAL THRUST BEARING FOR ROTARY SHAFTS
Johannes Adrianus Haringx, Everhardus Albertus Muijderman, and Herre Rinia, all of Emmasingel, Eindhoven, Netherlands, assignors to North American Philips Company, Inc., New York, N.Y., a corporation of Delaware
Filed June 29, 1961, Ser. No. 120,779
Claims priority, application Netherlands July 23, 1960
8 Claims. (Cl. 308—9)

This invention relates to an axial thrust bearing for a shaft rotating in a medium, comprising a fixed supporting member having a rotation-symmetrical cavity the generatrix of which is a curved line and the axis of rotation of which coincides with centre line of the shaft, while the shaft has a central thrust member co-acting with the supporting member during operation and the co-acting surfaces of the two members have the same shape. Such a thrust bearing is known and in this known thrust bearing one surface is provided with non inter-connected shallow depressions. According to the invention, one surface is provided with continuous and identical shallow grooves of rectangular section which are regularly divided at least over a portion of the surface area, the centre line of each groove being part of a spiral formed so that during operation the medium is pushed from the outside of the bearing to the interior, while each groove opens into a chamber centrally provided in the member. The chamber, during operation, communicates with the outside of the bearing only through the space then appearing between the members and through the grooves. Such a bearing is particularly suited for a vertically-positioned shaft which rotates at a high speed in operation such, for example, as shafts of ultra-centrifuges, yarn-coiling machines, thread-uncoiling machines and similar machines. A bearing according to the invention affords the advantage that it has a carrying capacity much greater than that of known bearings, while the coefficient of friction is much less, resulting in comparatively small frictional losses.

In one embodiment of the invention, the width of the dam between two grooves is always equal to the width of a groove at the same point. A maximum carrying capacity is thus obtained for a given bearing.

In another embodiment of the invention, the surface which is not provided with grooves likewise has a chamber which is open at one side in operation. The manufacturing of the bearing is thus simplified.

In still another embodiment of the invention, in order to absorb any radial forces acting upon the shaft, the rotary part of the shaft comprises not only a rotation-symmetrical portion with a curved line as a generatrix, but also a similar portion with a straight line as a generatrix, which adjoins the curved portion. This straight portion can turn, for example, in a ball bearing.

In one embodiment of the invention, the medium in which the bearing is arranged has a low viscosity. This is possible because the bearing has a high carrying capacity in operation. The medium may be air, but also may be oil.

In order that the invention may be readily carried into effect, it will now be described in detail, by way of example, with reference to the accompanying diagrammatic drawing, in which.

Figure 1:
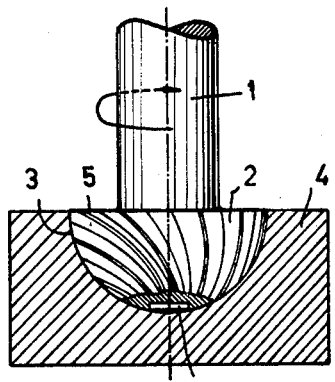
FIGURE 1 is a sectional view, along the centre line, of an axial thrust bearing for a vertical rotary shaft, the thrust member being shown in elevation.
Figure 3:
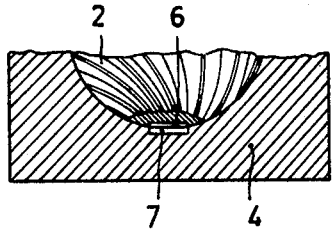
FIGURE 3 shows another embodiment of the supporting member.
Figure 2:
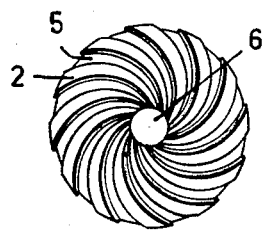
FIGURE 2 is a view of the bottom of the shaft with the thrust member of FIGURE 1.

Referring now to FIGURE 1, a vertically-positioned rotary shaft 1, which can rotate in the direction indicated by an arrow, comprises a thrust member 3 having the shape of a hemisphere. When the shaft 1 does not rotate, the thrust member 2 rests in a cavity 3, likewise spherical, provided in a supporting member 4. The thrust member 2 is provided with grooves 5 of rectangular section which are regularly divided over the surface of the hemisphere and which have a helical shape, as can be readily seen from FIGURE 2. The direction of the grooves is such that the medium in which the shaft rotates is pushed in operation from the exterior to the interior for the indicated direction of rotation. The width of a dam or wall between two grooves at each point is equal to the width of the groove at the same point. The grooves open into a chamber 6 which is open at one side in operation and which thus communicates with the outside of the bearing only through the grooves and through the space appearing between the thrust member and the supporting member in operation. The space between the members ensues, as previously mentioned, from the direction of the grooves being such, that in operation the medium flows from the exterior to the interior and hence a pressure is built up in the grooves and in the chamber, resulting in the shaft with its member being slightly lifted. A similar chamber, indicated by 7 in FIGURE 3, may also be provided in the supporting member 4 and in this case the depth of the chamber 6 may be smaller. A bearing of the design shown in FIGURES 1, 2 and 3 has a higher carrying capacity and its coefficient of friction is less than that of the corresponding known bearing wherein the supporting surface has no continuous grooves and which lacks a chamber open at one side only, which communicates with the outside of the bearing only through the grooves and through the space appearing between the members during operation.

In the drawing, the grooves are provided in the rotary portion of the bearing. However, as far as the operation of the bearing is concerned, they may be provided as well in the fixed portion, in which event the direction of the grooves is to be reversed. It will be evident that this direction must always be in agreement with the direction of rotation so that the medium is pushed from the exterior to the interior. Preferably the grooves are provided at an area where the material of the bearing is at least subject to wear.

The grooves were found to be about 15 microns deep in a shaft of 5 mms. in diameter, having a thrust member 2 or 3 mms. in diameter and performing 10,000 revolutions per minute. The space between the thrust member and the supporting member in operation was about 5 microns. The depth of the grooves is usually several times larger than the space between the thrust member and the supporting member which is permissible in operation.

Since the bearing has a high carrying capacity, it is particularly suited for a medium of low viscosity. For this purpose use may be made of a gas, for example air. For the bearing of the said dimensions, use was made of a light oil having a low viscosity at a normal temperature.

Figure 4:
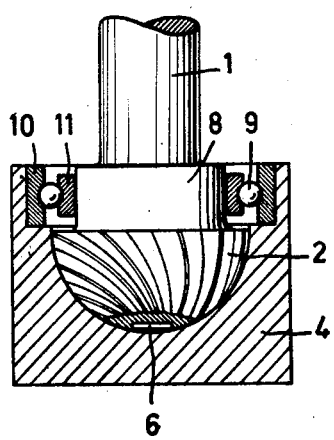
FIGURE 4 shows an axial thrust bearing as in FIGURE 1 with a device for absorbing radial forces.

In FIGURE 4, the shaft 1 comprises, in addition to the thrust member 2, a cylindrical collar 8 which rests in a race constituting a ball bearing 9, and an outer ring 10 of which is rigidly secured to the supporting member 4. The collar 8 is slidable in an inner ring 11 of the ball bearing race. Any radial forces acting upon the shaft can be absorbed, while the shaft 1, together with the collar 8 and the thrust member 2, can rise slightly in operation due to the inner ring 11 being a little narrower than the outer ring 10. It will be evident that it is also possible to provide for the spherical surface forming the boundary for the thrust member 2 to extend further to the shaft 1 and for the portion of the spherical surface projecting from the supporting member 4 to be embraced by either a suitably-shaped inner running ring of a ball bearing or the shell of an ordinary frictional bearing.

Figure 5:
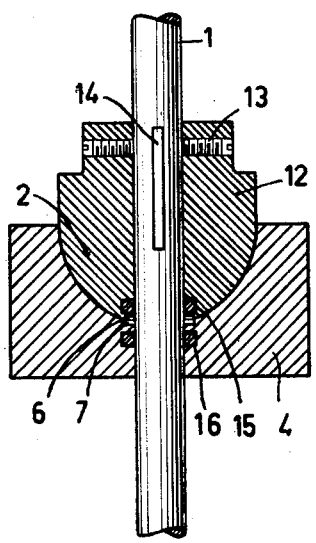
FIGURE 5 is a sectional view of thrust bearing as shown in FIGURES 1, 2 and 3, but now with the shaft extending through the bearing.

FIGURE 5 shows an embodiment in which the shaft 1 is passed through the bearing. The spherical surface 3 is now provided on a thrust member 12 secured to the shaft 1 by means of screws 13, while a wedge 14 prevents the thrust member 12 from turning relative to the shaft 1. The grooves 2 again open into a chamber 6 which is closed at its upper side by an O-ring 15, which embraces the shaft 1, so that in this case also the chamber 6 is open at one side only. The supporting member 4 comprises, as before, a chamber 7 which is sealed relative to the shaft 1 by means of an O-ring 16. In this embodiment also the two chambers are open at one side only during operation. The upper surface of the portion of the thrust member 12 projecting from the supporting member 4, which is not provided with screws, may serve again, in coaction with a suitable bearing, to receive radial forces.

In the embodiment shown in FIGURE 5, a plurality of such bearings may be positioned one after another if the axial forces are considerable.

The grooves, in certain cases are very shallow, and in spherical surfaces of small dimensions cannot be provided simply by a chipping operation. It has been found in practice that such grooves may be provided in a suitable manner by etching. A treatment by means of erosion, for example with sand, diamond powder or hard metal powder also yields favorable results.

It is not necessary for the surfaces of the supporting member and of the thrust member to be portions of spherical surfaces. Other parts of surfaces showing rotational symmetry and having a curved line as a generatrix may be used as well.

What is claimed is:

1. An axial thrust bearing for a shaft rotatable in a medium comprising a fixed supporting member having a symmetrical cavity accommodating a part of a shaft, the generatrix of said cavity being a curved line and having an axis of rotation coinciding with the center line of said shaft, said shaft having a central thrust member co-acting with said fixed supporting member in operation, the co-acting surfaces of said central thrust member and cavity having substantially the same general shape, one of said surfaces being provided with continuous and substantially identical shallow grooves which are regularly divided over at least a portion of the surface area, the center line of each groove forming a spiral whereby during operation of said bearing the medium is pushed from the outside of the bearing to the inside thereof, and a chamber centrally located in said one of said surfaces being provided with identical, shallow grooves, each groove opening into said chamber and the latter communicates with the outside of said bearing only through a space formed between one of the members and said grooves.

2. An axial thrust bearing for a shaft rotatable in a medium as claimed in claim 1 wherein the width of the wall between two adjacent grooves is always equal to the width of the groove at the same point.

3. An axial thrust bearing for a shaft rotatable in a medium comprising a fixed supporting member having a symmetrical cavity accommodating a part of a shaft, the generatrix of said cavity being a curved line and having an axis of rotation coinciding with the center line of said shaft, said shaft having a central thrust member co-acting with said fixed supporting member in operation, the co-acting surfaces of said central thrust member and cavity having substantially the same general shape, one of said surfaces being provided with continuous and substantially identical shallow grooves which are regularly divided over at least a portion of the surface area, the center line of each groove forming a spiral whereby during operation of said bearing the medium is pushed from the outside of the bearing to the inside thereof, and a chamber centrally located in said one of said surfaces being provided with identical, shallow grooves and which is open at only one side when operative, each groove opening into said chamber and the latter communicates with the outside of said bearing only through a space formed between one of the members and said grooves.

4. An axial thrust bearing for a shaft rotatable in a medium comprising a fixed supporting member having a symmetrical cavity being a curved line and having an axis of rotation coinciding with the center line of a shaft, said shaft having a central thrust member co-acting with said fixed supporting member in operation, said shaft being provided with a symmetrical portion having a curved line as a generatrix and another portion having a straight line as a generatrix which adjoins the curved line to thereby form a hemispherical body, the co-acting surfaces of said central thrust member and cavity having substantially the same general shape, one of said surfaces being provided with continuous and substantially identical shallow grooves which are regularly divided over at least a portion of the surface area, the center line of each groove forming a spiral whereby during operation of said bearing the medium is pushed from the outside of the bearing to the inside thereof, and a chamber centrally located in said one of said surfaces being provided with identical, shallow grooves, each groove opening into said chamber and the latter communicates with the outside of said bearing only through a space formed between one of the members and said grooves.

5. An axial thrust bearing for a shaft rotatable in a medium as claimed in claim 1 wherein the medium in which the bearing is arranged has a low viscosity.

6. An axial thrust bearing for a shaft rotatable in a medium as claimed in claim 1 wherein the medium is oil.

7. An axial thrust bearing for a shaft rotatable in a medium as claimed in claim 4 further comprising a race, and ball bearings in said race, said ball bearings and race being located adjacent to said straight line portion of said shaft having a diameter larger than the diameter of said shaft.

8. An axial thrust bearing for a shaft rotatable in a medium as claimed in claim 1 whereby the shaft passes through said bearing, and wedge means being further provided to prevent the central thrust member from rotating relative to said shaft.

References Cited in the file of this patent

UNITED STATES PATENTS

| | | |
|---|---|---|
| 1,476,345 | McGee | Dec. 4, 1923 |
| 1,987,937 | Howarth | Jan. 15, 1935 |
| 2,722,463 | Shaw et al. | Nov. 1, 1955 |
| 2,864,552 | Anderson | Dec. 11, 1958 |
| 2,899,243 | Acterman | Aug. 11, 1959 |
| 2,937,804 | Reiner et al. | May 24, 1960 |
| 3,027,471 | Burgwin et al. | Mar. 27, 1962 |